(12) United States Patent
Chritz et al.

(10) Patent No.: US 9,444,827 B2
(45) Date of Patent: Sep. 13, 2016

(54) MULTI-FUNCTION, MODULAR SYSTEM FOR NETWORK SECURITY, SECURE COMMUNICATION, AND MALWARE PROTECTION

(71) Applicant: Pico Computing, Inc., Seattle, WA (US)

(72) Inventors: Jeremy B. Chritz, Seattle, WA (US); Graham G. Schwinn, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/608,438

(22) Filed: Jan. 29, 2015

(65) Prior Publication Data

US 2015/0237058 A1     Aug. 20, 2015

Related U.S. Application Data

(60) Provisional application No. 61/940,413, filed on Feb. 15, 2014.

(51) Int. Cl.

| H04L 29/06 | (2006.01) |
|---|---|
| H04L 29/08 | (2006.01) |
| G06F 13/42 | (2006.01) |
| G06F 13/40 | (2006.01) |
| G06F 21/53 | (2013.01) |
| G06F 21/76 | (2013.01) |

(52) U.S. Cl.
CPC ....... *H04L 63/1408* (2013.01); *G06F 13/4022* (2013.01); *G06F 13/4221* (2013.01); *G06F 21/53* (2013.01); *G06F 21/76* (2013.01); *H04L 67/10* (2013.01)

(58) Field of Classification Search
CPC  H04L 63/1408; H04L 67/10; G06F 13/4221
USPC ....................... 726/2, 12, 23, 27; 710/8, 301
See application file for complete search history.

(56) References Cited

U.S. PATENT DOCUMENTS

| 8,095,508 B2 * | 1/2012 | Chamberlain | .... G06F 17/30982 707/636 |
| 8,793,795 B1 * | 7/2014 | Ravid | ................... G06F 21/567 726/24 |

(Continued)

OTHER PUBLICATIONS

"Optimized Malware Detection in Digital Forensics"—Almarri et al, Institute for Research in Applicable Computing, University of Bedfordshire, Jan. 2014 http://airccse.org/journal/nsa/6114nsa01.pdf.*

*Primary Examiner* — Randy Scott
(74) *Attorney, Agent, or Firm* — Nancy R. Gamburd; Gamburd Law Group LLC

(57) ABSTRACT

Representative embodiments are disclosed for providing network and system security. A representative apparatus includes an input-output connector coupleable to a data network; a network interface circuit having a communication port; a nonvolatile memory storing a configuration bit image; and a field programmable gate array ("FPGA") coupled to the network interface circuit through the communication port, the FPGA configurable to appear solely as a communication device to the first network interface circuit, and to bidirectionally monitor all data packets transferred between the input-output connector and the first network interface circuit and any coupled host computing system. In another embodiment, the FPGA is further configurable for only a partial implementation of a communication protocol, such as a PCIe data link and/or physical layers. The FPGA may also monitor host memory and provide encryption and decryption functionality. The FPGA is not addressable within the computing system and therefore is largely undetectable by malware.

24 Claims, 7 Drawing Sheets

(56) References Cited

U.S. PATENT DOCUMENTS

2008/0270651 A1\* 10/2008 Kreiner .............. H04L 67/1097 710/106

2009/0282483 A1\* 11/2009 Bennett .............. H04L 63/1416 726/23

2010/0161838 A1\* 6/2010 Daniel .................. G06F 13/385 710/8

\* cited by examiner

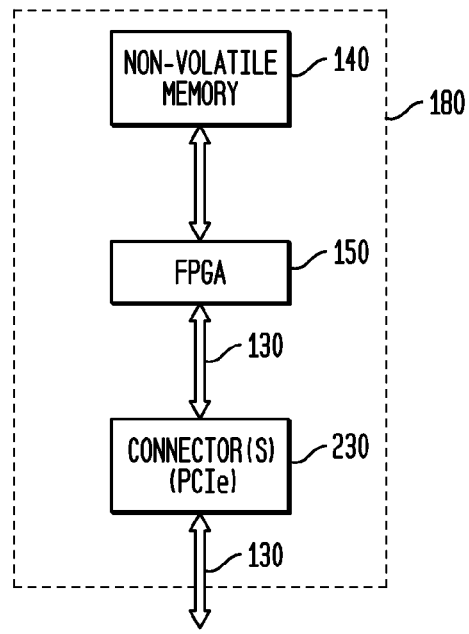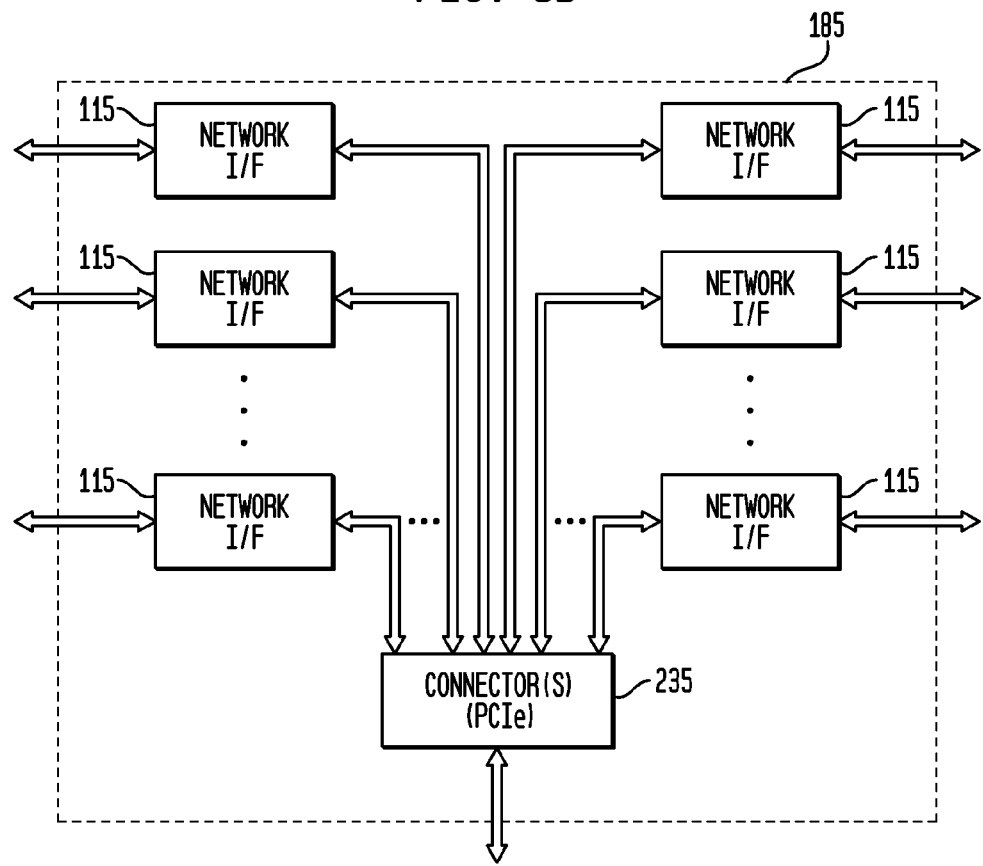

MULTI-FUNCTION, MODULAR SYSTEM FOR NETWORK SECURITY, SECURE COMMUNICATION, AND MALWARE PROTECTION

CROSS-REFERENCE TO RELATED APPLICATIONS

This application is a nonprovisional of and claims the benefit of and priority to U.S. Provisional Patent Application No. 61/940,413, filed Feb. 15, 2014, inventors Jeremy B. Chritz et al., titled "Multi-Function, Modular System for Network Security, Secure Communication, and Malware Protection", which is commonly assigned herewith, the entire contents of which are incorporated herein by reference with the same full force and effect as if set forth in their entirety herein, and with priority claimed for all commonly disclosed subject matter.

FIELD OF THE INVENTION

The present invention relates generally to network security, and more specifically to a multi-function, modular system which can provide network security, secure communication, and malware protection.

BACKGROUND

Network security is an increasing problem throughout the world, for any network coupled to the Internet, with computer viruses, worms, Trojan horses, and other computing system malware (individually and collectively referred to as "malware") resulting in expensive data losses, theft of intellectual property, theft of financial information, privacy intrusions, identity theft, and so on. This continues to be a problem not only for private industry, but also governmental entities such as the military, and regulated industries such as power companies. Any successful attack on the networks of such entities can be devastating nationally and globally.

Software approaches to such network security, such as through anti-virus and anti-malware programs, have limited utility. They may be comparatively slow to operate, and typically do not provide immediate protection against new threats. Network security software may also be readily circumvented in sophisticated malware attacks.

Accordingly, a need remains for a system having both hardware and software co-design to provide for significant network security, secure communications, and malware protection. Such a system should be modular for use in any number of different types of systems, and further provide for minimal host involvement.

SUMMARY OF THE INVENTION

The exemplary embodiments of the present invention provide numerous advantages. Exemplary embodiments provide for using a field programmable gate array ("FPGA") arranged between a network and host computing system, and effectively undetectable by either the network or the host computing system. This allows the FPGA to monitor all data traffic into the host computing system from a network and into the network from the host computing system.

A representative apparatus embodiment comprises: an input-output connector coupleable to a data network; a first network interface circuit coupleable to a first PCIe communication line for communication with a host computing system, the first network interface further having at least one communication port; a nonvolatile memory storing a configuration bit image; and a field programmable gate array coupled to the input-output connector and to the nonvolatile memory, the field programmable gate array further coupled to the first network interface circuit through the at least one communication port, the field programmable gate array configurable using the configuration bit image to appear solely as a communication device to the first network interface circuit when coupled to the at least one communication port, and the field programmable gate array configurable to bidirectionally monitor all data packets transferred between the input-output connector and the first network interface circuit and any coupled host computing system.

In a representative embodiment, the field programmable gate array may be further configurable to detect a malware data packet. In a representative embodiment, the field programmable gate array may be further configurable, in response to detection of a malware data packet from the host computing system, to halt the host computing system.

In a representative embodiment, the field programmable gate array may be further configurable, in response to detection of a malware data packet from the input-output connector or the data network, to discard the malware data packet or to monitor an operation implemented using the malware data packet.

In a representative embodiment, the field programmable gate array may be further configurable to monitor a host memory and, in response to an unauthorized modification, to halt a host processor and restore a host operating system. In a representative embodiment, the nonvolatile memory further stores an operating system image, and the field programmable gate array is further configurable to monitor the host operating system and, in response to an unauthorized modification, to restore the host operating system using the operating system image. A representative embodiment may also further comprise a second memory coupled to the field programmable gate array, the second memory storing an operating system image, and the field programmable gate array is further configurable to monitor the host operating system and, in response to an unauthorized modification, to restore the host operating system using the operating system image.

In another representative embodiment, the field programmable gate array may be further configurable to decrypt all data packets from the input-output connector and to encrypt all data packets from the first network interface circuit and any coupled host computing system.

In a representative embodiment, the at least one communication port is a serial gigabit media independent interface port.

A representative embodiment may also further comprise a second PCIe communication line coupled to the field programmable gate array; wherein the field programmable gate array is further configurable using the configuration bit image for only a partial implementation of a communication protocol. In a representative embodiment, the partial implementation of the communication protocol is a PCIe physical layer, or a PCIe physical layer and a PCIe data link layer.

Another representative apparatus embodiment comprises an input-output connector coupleable to a data network; a first network interface circuit coupleable to a first PCIe communication line for communication with a host computing system, the first network interface further having at least one communication port; a nonvolatile memory storing a configuration bit image; and a field programmable gate array coupled to the input-output connector and to the nonvolatile memory, the field programmable gate array further coupled to the first network interface circuit through the at least one communication port, the field programmable gate array further coupleable to a second PCIe communication line for communication with the host computing system, the field programmable gate array configurable using the configuration bit image to appear solely as a communication device to the first network interface circuit when coupled to the at least one communication port, the field programmable gate array further configurable using the configuration bit image for only a partial implementation of a communication protocol, and the field programmable gate array configurable to bidirectionally monitor all data packets transferred between the input-output connector and the first network interface circuit and any coupled host computing system.

A representative embodiment of a network interface circuit board is also disclosed, comprising: an input-output connector coupleable to a data network; at least one first PCIe communication line; at least one PCIe connector to couple the at least one first PCIe communication line to a host computing system; a first network interface circuit coupleable to the first PCIe communication line for communication with a host computing system, the first network interface further having at least one communication port; a nonvolatile memory storing a configuration bit image; and a field programmable gate array coupled to the input-output connector and to the nonvolatile memory, the field programmable gate array further coupled to the first network interface circuit through the at least one communication port, the field programmable gate array configurable using the configuration bit image to appear solely as a communication device to the first network interface circuit when coupled to the at least one communication port, the field programmable gate array configurable to bidirectionally monitor all data packets transferred between the input-output connector and the first network interface circuit and any coupled host computing system.

A representative embodiment for a method of providing network security is also disclosed in a system having a field programmable gate array ("FPGA") coupled between a network and a first network interface circuit coupleable to a host computing system, the method comprising: configuring the field programmable gate array to appear as a communication device to the first network interface circuit; and using the field programmable gate array, bidirectionally monitoring all data packets transferred between the first network interface circuit and the host computing system.

In a representative embodiment, the field programmable gate array is configured with a device name and link speed to appear as a communication device to a serial gigabit media independent interface port of the first network interface circuit.

In a representative embodiment, the method may further comprise: using the field programmable gate array, detecting a malware data packet, and in response to a detection of a malware data packet, performing at least one action selected from the group consisting of: halting the host computing system; discarding the malware data packet; monitoring an operation implemented using the malware data packet; and halting a host processor and restoring a host operating system.

In another representative embodiment, the method may further comprise configuring the field programmable gate array for only a partial implementation of a communication protocol, such as a PCIe physical layer, or a PCIe physical layer and a PCIe data link layer.

A representative multi-function, modular apparatus embodiment comprises: a plurality of PCIe communication lines, a first PCIe communication line coupleable to a first network interface circuit, and a second PCIe communication line coupleable to a host computing system; a nonvolatile memory storing a configuration bit image; and a field programmable gate array coupled to the first PCIe communication line for communication with the first network interface circuit and further coupled to the second PCIe communication line for communication with the host computing system, the field programmable gate array further coupled to the nonvolatile memory, the field programmable gate array configurable using the configuration bit image for only a partial implementation of a communication protocol, and the field programmable gate array configurable to bidirectionally monitor all data packets transferred between the first network interface circuit and the host computing system.

In a representative embodiment, the field programmable gate array is further configurable to detect a malware data packet. Also in a representative embodiment, the field programmable gate array is further configurable, in response to detection of a malware data packet from the host computing system, to halt the host computing system. Also in a representative embodiment, the field programmable gate array is further configurable, in response to detection of a malware data packet from the first network interface circuit, to discard the malware data packet. In another representative embodiment, the field programmable gate array is further configurable, in response to detection of a malware data packet from the first network interface circuit, to monitor an operation implemented using the malware data packet.

In a representative embodiment, the communication protocol is PCIe and the field programmable gate array is configurable only for a physical layer and a data link layer of the PCIe protocol.

In another representative embodiment, the field programmable gate array is further configurable to monitor a host memory and, in response to an unauthorized modification, to halt a host processor and restore a host operating system. In a representative embodiment, the nonvolatile memory further stores an operating system image, and the field programmable gate array is further configurable to monitor the host operating system and, in response to an unauthorized modification, to restore the host operating system using the operating system image. In another representative embodiment, the apparatus further comprises a second memory coupled to the field programmable gate array, the second memory storing an operating system image, and the field programmable gate array is further configurable to monitor the host operating system and, in response to an unauthorized modification, to restore the host operating system using the operating system image.

In another representative embodiment, the field programmable gate array is further configurable to decrypt all data packets from the first network interface circuit; and also the field programmable gate array is further configurable to encrypt all data packets from the host computing system.

In another representative embodiment, the apparatus further comprises at least one PCIe connector coupled to the plurality of PCIe communication lines for coupling to a first network interface circuit. For example, the field programmable gate array, the nonvolatile memory, the plurality of PCIe communication lines, and the at least one PCIe connector may be collocated on a first circuit board, and the first network interface circuit is located on a second ciruit board coupleable to the first circuit board using the at least one PCIe connector. Also for example, the first and second circuit boards may be rack-mountable.

In another representative embodiment, the apparatus further comprises a second network interface circuit couplable to a trusted network.

In a representative embodiment, the field programmable gate array is not addressable by the first network interface circuit or by the host computing system.

Another representative embodiment provides a network interface circuit board, comprising: a first network interface circuit; at least one PCIe connector; a plurality of PCIe communication lines, a first PCIe communication line couplable to the first network interface circuit, and a second PCIe communication line couplable through the at least one PCIe connector to a host computing system; a nonvolatile memory storing a configuration bit image; and a field programmable gate array coupled to the first PCIe communication line for communication with the first network interface circuit and further coupled to the second PCIe communication line for communication with the host computing system, the field programmable gate array further coupled to the nonvolatile memory, the field programmable gate array configurable using the configuration bit image for only a partial implementation of a communication protocol, and the field programmable gate array configurable to bidirectionally monitor all data packets transferred between the first network interface circuit and the host computing system.

A method of providing network security in a system having a field programmable gate array ("FPGA") coupled between a host computing system and a first network interface circuit is also disclosed, with the method comprising: configuring the field programmable gate array for only a partial implementation of a communication protocol; and using the field programmable gate array, bidirectionally monitoring all data packets transferred between the first network interface circuit and the host computing system.

A representative method embodiment may further comprise using the field programmable gate array to detect a malware data packet. In a representative embodiment, the method may further comprise using the field programmable gate array, and in response to a detection of a malware data packet from the host computing system, halting the host computing system. In a representative embodiment, the method may further comprise using the field programmable gate array, and in response to a detection of a malware data packet from the first network interface circuit, discarding the malware data packet. In a representative embodiment, the method may further comprise using the field programmable gate array, and in response to a detection of a malware data packet from the first network interface circuit, monitoring an operation implemented using the malware data packet.

A representative method embodiment may further comprise configuring the field programmable gate array to monitor a host memory and, in response to an unauthorized modification, to halt a host processor and restore a host operating system.

A representative method embodiment may further comprise configuring the field programmable gate array to decrypt all data packets from the first network interface circuit. A representative method embodiment may further comprise configuring the field programmable gate array to encrypt all data packets from the host computing system.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIG. 3, divided into FIGS. 3A and 3B, is a block diagram illustrating an exemplary or representative first modular apparatus embodiments.

DETAILED DESCRIPTION OF REPRESENTATIVE EMBODIMENTS

Figure 1:
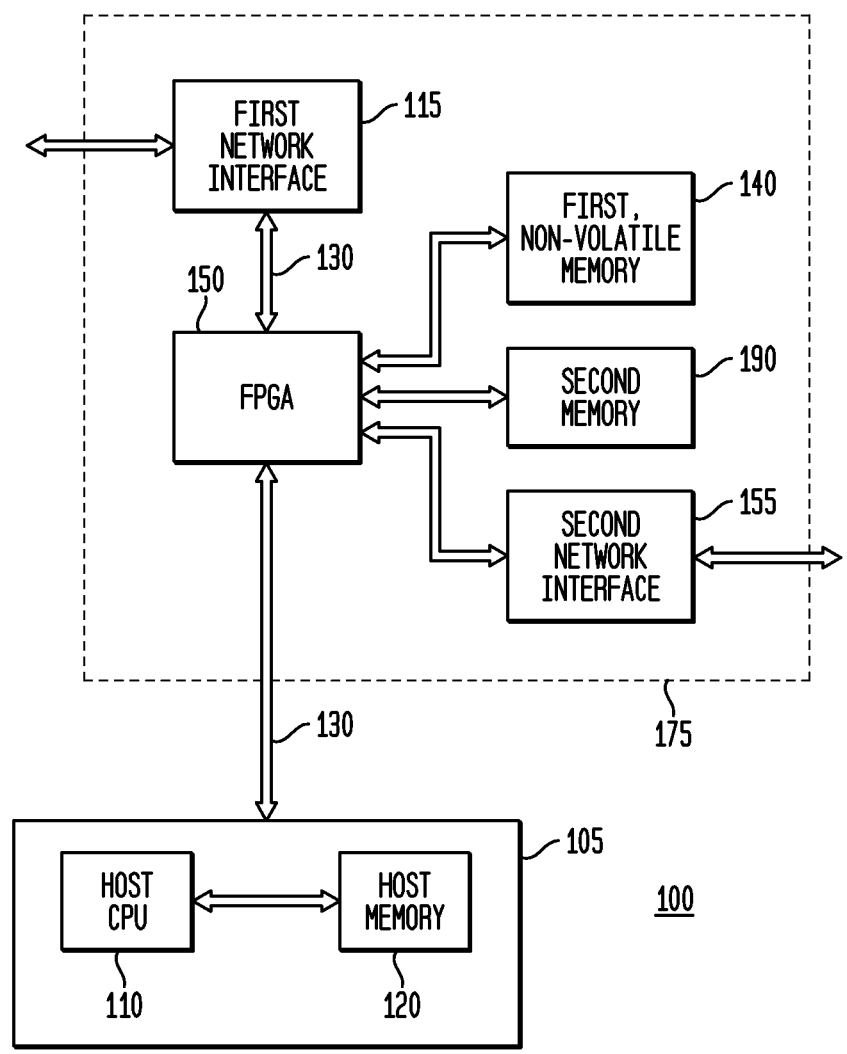
FIG. 1 is a block diagram illustrating an exemplary or representative first system embodiment.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

FIG. 1 is a block diagram illustrating an exemplary or representative first system 100 embodiment. As illustrated in FIG. 1, the system 100 includes one or more host computing systems 105, such as a computer or workstation, having one or more central processing units (CPUs) 110, which may be any type of processor, and host memory 120, which may be any type of memory, such as a hard drive or a solid state drive, and which may be located with or separate from the host CPU 110, all for example and without limitation, and as discussed in greater detail below. The memory 120 typically stores an operating system, one or more applications, and data for the host computing system 105, and depending upon the selected embodiment, may also store one or more configuration bit files or images for a selected application. Not separately illustrated, any of the host computing systems 105 may include a plurality of different types of processors, such as graphics processors, multi-core processors, etc., also as discussed in greater detail below.

Figure 2:
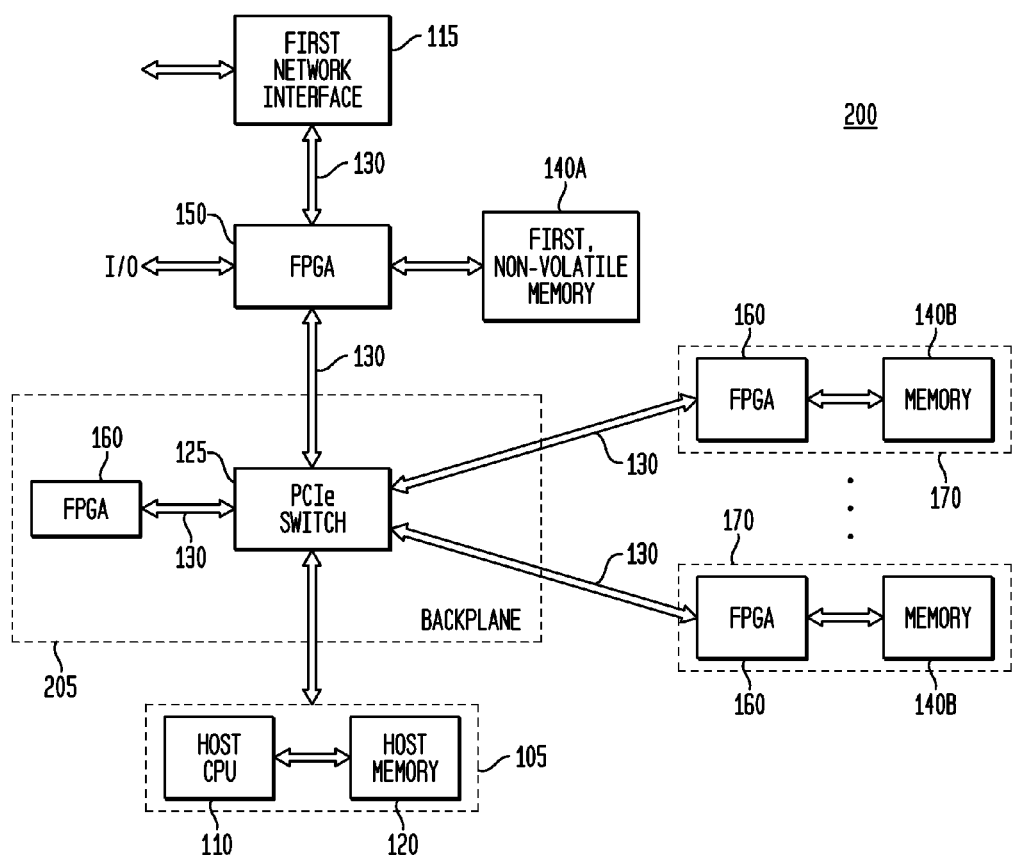
FIG. 2 is a block diagram illustrating an exemplary or representative second system embodiment.

In the system 100, the one or more host computing systems 105 are typically coupled through one or more communication channels or lines, illustrated as PCI express (Peripheral Component Interconnect Express or "PCIe") lines 130 (either directly or through a PCIe switch 125 (FIG. 2) (such as a PLX switch), to a configurable logic element such as one or more FPGAs 150 (such as a Spartan 6 FPGA or ARTIX 7 FPGA, for example and without limitation) which has been configured, as discussed in greater detail below, for one or more of the network security applications of this disclosure. As there may be other FPGAs 160 within the system (as illustrated in FIG. 2), FPGA 150 may also be referred to as the network security FPGA 150. FPGAs 150 and 160 may be the same type of FPGA, and are provided with different reference numerals solely to differentiate the specific functions assigned to and the location of the network security FPGA 150. For example, the various FPGAs 150, 160 may be on identical circuit boards or modules 170, 180, for example, and may be interchangeable.

The FPGA 150 in turn is coupled to a nonvolatile memory 140, such as a FLASH memory, and optionally to another memory 190, such as any type of random access memory (e.g., one or more DDR2 SODIMM integrated circuits, for example and without limitation), as discussed in greater detail below. The network security FPGA 150 is further coupled, also via a PCIe line 130, to a first or primary network interface (circuit) 115, which may be any type of network interface circuit (typically embodied as an integrated circuit, such as the network interface circuitry available from Intel Corp.), which provides an interface to a network, such as an Ethernet interface, also for example and without limitation. Optionally, network security FPGA 150 may also be further coupled, also via a PCIe line 130, to a second or secondary network interface 155, which also may be any type of network interface (as mentioned above, such as an Ethernet interface), which provides a separate interface to a nonpublic, trusted network, also for example and without limitation. In an alternative embodiment, the secondary network interface 155 functionality may be incorporated directly into the input-output functionality of the network security FPGA 150.

In a first embodiment, the network security FPGA 150, primary network interface 115, memory 140, and optionally memory 190 and secondary network interface 155, are collocated on a dedicated circuit board 175, as a network interface card ("NIC") embodiment, such as for use in a host computing system 105, which may have any embodiment, such as a laptop, a tablet, a desktop, a server, etc., all for example and without limitation. In a second, modular embodiment illustrated in FIGS. 3A and 3B, the network security FPGA 150, memory 140, and optionally memory 190, are collocated on a first, modular circuit board 180 (discussed in greater detail below), which is couplable as a module to a second modular circuit board 185 which contains one or more primary network interfaces 115 and optionally one or more secondary network interface 155, both of which function as modules in a rack mounted system having many such boards 180, 185, such as those available from Pico Computing of Seattle, Wash. US, such as the system 200 illustrated in FIG. 2. Not separately illustrated for FIGS. 3A and 3B, those having skill in the art with recognize that to coincide with a system 400 embodiment discussed below, a plurality of FPGAs 150 with I/O connector(s) 415 may be substituted in place of the primary network interfaces 115 of FIG. 3B, and a primary network interface 115 substituted in place of the FPGA 150 in FIG. 3A, but with the plurality of FPGAs 150 of FIG. 3B provided with connections to the memory 140 in FIG. 3A.

FIG. 2 is a block diagram illustrating an exemplary or representative second system 200 embodiment. The system 200 differs insofar as a PCIe switch 125 is also included for communication between and among the various illustrated components, along with a plurality of modules 180, and serves to illustrate the components typically found in a rack mounted system available from Pico Computing of Seattle, Wash. US.

For example, in an exemplary embodiment, each of the modular circuit boards 180 have corresponding PCIe input-output (I/O) connectors 230 to plug into mating I/O connectors 235, on either the modular network interface board 185, or into another region or slot of a backplane 205 board (also available from Pico Computing of Seattle, Wash. US). For purposes of the present disclosure, both systems 100 and 200 functions similarly, and any and all of these system configurations are within the scope of the disclosure. Not separately illustrated in FIGS. 1, 2, 3A and 3B, 5 and 6, each of the various circuit modules or boards 170, 175, 180, 185 typically include many additional components, such as power supplies, additional memory, additional input and output circuits and connectors, switching components, possibly timing or clock components, etc.

As a consequence, for purposes of the present disclosure, a system 100, 200 comprises one or more host computing systems 105, couplable through one or more communication lines (such as PCIe communication lines, directly or through a PCIe switch 125), to one or more network security FPGAs 150. In turn, the network security FPGA 150 is coupled through one or more communication lines, also such as PCIe communication lines 130, to one or more primary network interfaces 115, which may be collocated with the network security FPGA 150 on the same circuit board (175) or which may be on separate circuit boards (180, 185).

Figure 5:
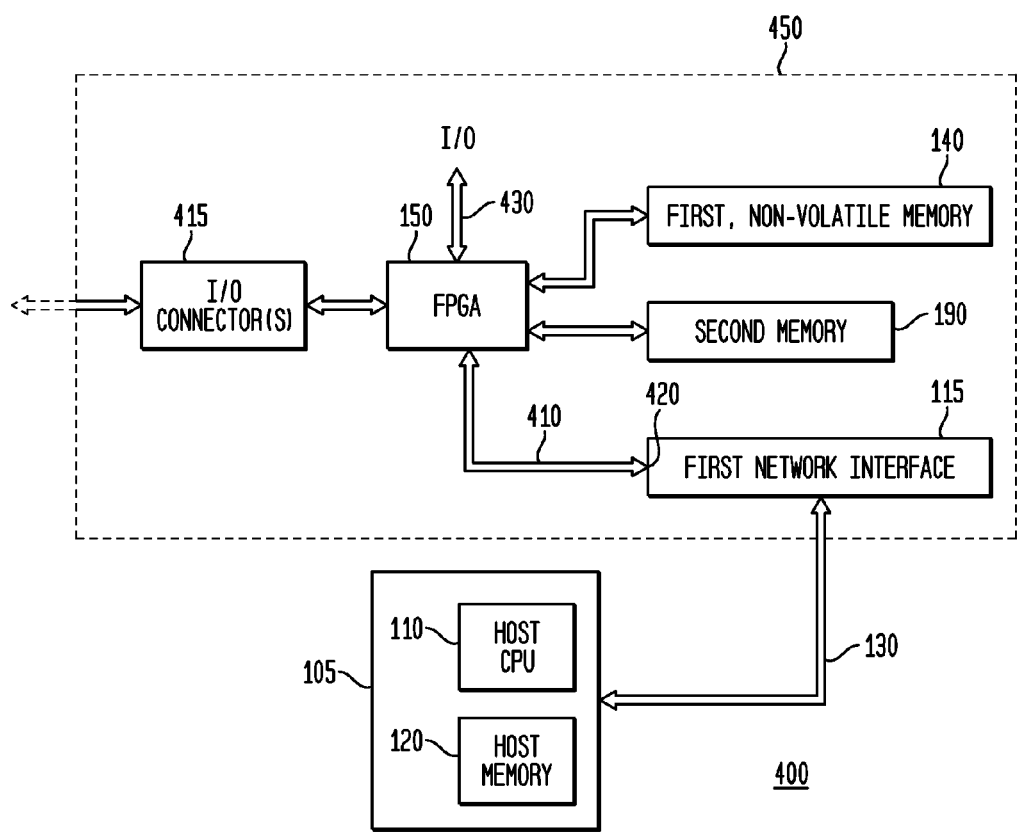
FIG. 5 is a block diagram illustrating an exemplary or representative third system embodiment and second apparatus embodiment.
Figure 6:
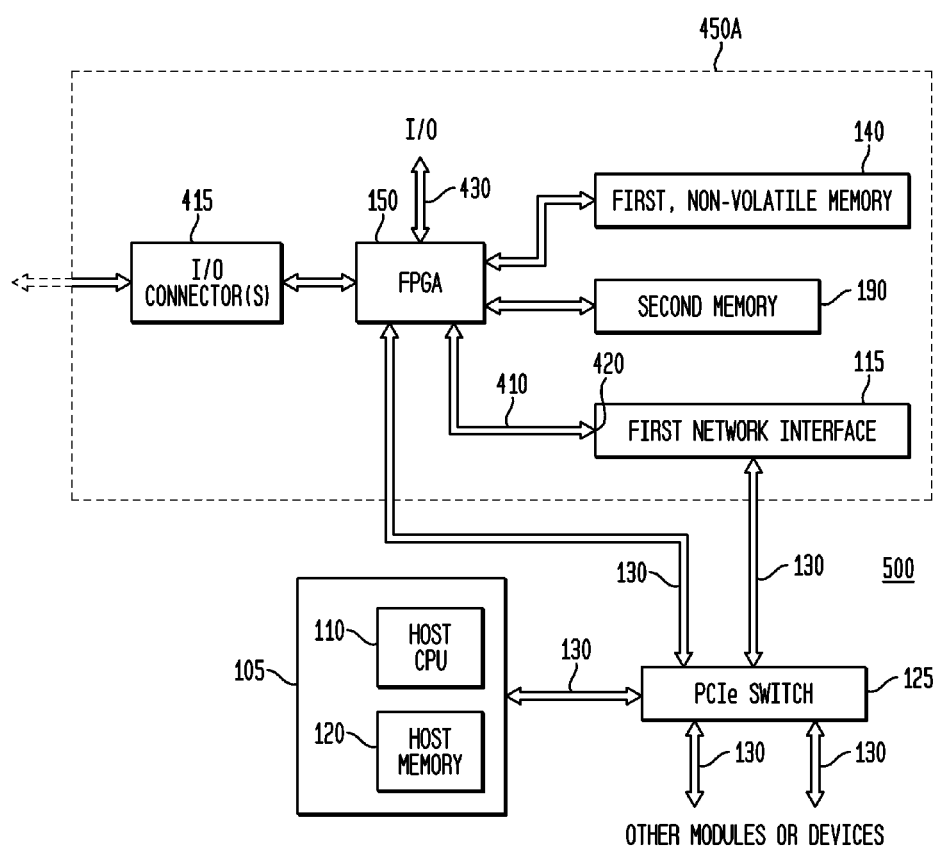
FIG. 6 is a block diagram illustrating an exemplary or representative fourth system embodiment and third apparatus embodiment.

FIG. 5 is a block diagram illustrating an exemplary or representative third system 400 embodiment and second apparatus 450 embodiment. FIG. 6 is a block diagram illustrating an exemplary or representative fourth system 500 embodiment and third apparatus 450A embodiment. Referring to FIGS. 5 and 6, the second apparatus 450 and third apparatus 450A are also illustrated network interface card embodiments as described above, but differ in that the network security FPGA 150 is coupled to input-output ("I/O") connector(s) 415, such as an RJ45 Ethernet jack, for direct communication to an external network, such as a nontrusted public network. The network security FPGA 150, through its internal data output drivers and data input receivers (not separately illustrated), provides for such external communication, typically in analog form. The network security FPGA 150, in turn, is coupled to a primary network interface 115, via communication line 410, and the primary network interface 115 is coupled to a host computing systems 105, such as via PCIe lines 130 as illustrated in FIG. 5, or optionally coupled through a PCIe switch 125 to a host computing systems 105, as illustrated in FIG. 6. The second apparatus 450 and third apparatus 450A differ insofar as third apparatus 450A may also include an optional connection from network security FPGA 150 to a PCIe switch 125, and in that event, the network security FPGA 150 may also be configured as discussed above and below for system 100, 200 embodiments. Additional I/O 430 may also be provided to and from the network security FPGA 150, such as for additional access by a system administrator. Not separately illustrated, the apparatus 450, 450A (and 450B) embodiments may be coupled (such as to PCIe lines 130) through one or more connector(s) 230, or have any of the other components, such as additional, second memory 190, a second network interface, etc., as previously discussed.

In an exemplary or representative system 400, 500 embodiment, the network security FPGA 150 is coupled to the primary network interface 115 through a different mechanism, illustrated as communication line 410, which is coupled to a special port or interface 420 of the primary network interface 115, in order to appear to the primary network interface 115 and the rest of the system 400, 500 as another communication module, such as a fiber optic communication module, typically by coupling into a serial gigabit media independent interface (as the interface 420), e.g., SGMII, of the primary network interface 115. As a result, the network security FPGA 150 appears as an effectively transparent Ethernet (or other network) port within the system 400, 500 and, in addition, is not a PCIe endpoint device, so does not require any implementation of any PCIe communication protocol stack (discussed below). Rather, the network security FPGA 150 is typically configured to appear to the primary network interface 115 as a supported communication device, such as a supported phy or (phi ("Φ" or "φ")) device, such as a configuration including a supported data link speed and a known phy (or phi) name.

From the standpoint of the host computing systems 105 and any incoming or outgoing malware, for example, the network security FPGA 150 is either effectively invisible (i.e., undetectable) or appears as nothing more than part of the primary network interface 115. Nonetheless, the network security FPGA 150 may access anything coupled to the host computing systems 105, such as to protect and rewrite host memory 120 in the event of a virus or malware infiltration, and further, may examine all incoming network traffic (from I/O connector(s) 415, though network security FPGA 150, primary network interface 115, to the host computing systems 105) and all outgoing network traffic from the host computing systems 105 (via the primary network interface 115, the network security FPGA 150, and I/O connector(s) 415).

The third system 400, and depending on how implemented, the fourth system 500 therefore provide for truly stealth security, as the network security FPGA 150 is truly invisible to the host computing systems 105 and any incoming or outgoing malware, virus, etc. As the network security FPGA 150 also is not a PCIe endpoint device, it does not require any type of PCIe addressing or protocols, so no mechanism is provided for malware or a malware bot to explore and find the network security FPGA 150 within the system 400, 500.

Figure 7:
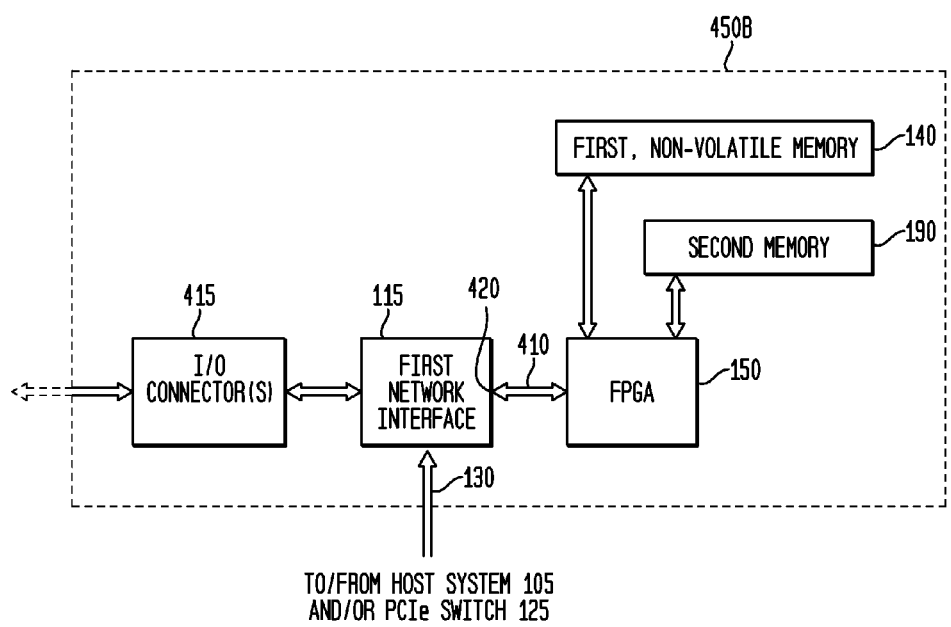
FIG. 7 is a block diagram illustrating an exemplary or representative fourth apparatus embodiment.

FIG. 7 is a block diagram illustrating an exemplary or representative fourth apparatus 450B embodiment, and illustrates a useful variation. This embodiment differs from those discussed above insofar as a primary network interface 115A is implemented which has additional configurability for multiple input and output ports. For this embodiment, the primary network interface 115A is coupled to I/O connector(s) 415 for data transmission and reception, but all incoming and outgoing data traffic is routed (bi-directionally) through a network security FPGA 150 (also not a PCIe endpoint device), as illustrated, and otherwise functions as discussed above (and below) for systems 100, 200, 400, 500.

The systems 100, 200, 400, 500 enable one of the significant features of the present disclosure, namely, the stealth or "ghost" operation of the network security FPGA 150. For purposes of the present disclosure, all that is required is that the network security FPGA 150 be coupled in between the primary network interface 115 and I/O connector(s) 415 for external communication, for systems 400, 500, or between any host computing system 105 and a primary network interface 115, for systems 100, 200 (and possibly 500), such that the network security FPGA 150 "sees" all data traffic moving both into and out of a system 100, 200, 400, 500 and, moreover, does so in a way that it is effectively invisible or undetectable within the system 100, 200, 400, 500, i.e., from the perspective of the system 100, 200, the network security FPGA 150 (including the modular circuit board 180 or 450, 450A) is merely a data conduit or pipe, having no further detectable presence within the system 100, 200, 400, 500.

In the event that a network security FPGA 150 is coupled as a PCIe endpoint device, such as in systems 100, 200, and possibly 500, to provide for the network security FPGA 150 to appear within the system 100, 200 (500) as merely a data conduit or pipe, i.e., to be a stealth or "ghost" device within the system 100, 200, at least one first part of its configuration (typically stored and provided in memory 140) is tightly controlled and limited, namely, the network security FPGA 150 does not implement any network or communication protocol which would make it addressable and therefore visible in the system system 100, 200 (500). More specifically, the network security FPGA 150 does not implement the complete PCIe protocol stack, and specifically implements no more than the physical layer and the data link layer, and not the transaction layer, of the PCIe protocol. Similarly, any processor core (not separately illustrated) within the network security FPGA 150 also does not implement any network or communication protocol which would make it addressable; for example, it does not implement DHCP (dynamic host configuration protocol). For other communication or network protocols, so long as the entire protocol stack is not implemented in a way that the network security FPGA 150 would be addressable or otherwise visible, the remainder of the protocol stack may be implemented as necessary or desirable for any selected embodiment.

As a result, for this type of system 100, 200 (500) embodiment, the primary network interface 115 and the host computing system 105 effectively do not know of the existence of the network security FPGA 150 within the system 100, 200 (500). Stated another way, the network security FPGA 150 is not given a false identity within the system 100, 200, it is given no identity. Within the system 100, 200 (500), it merely looks like part of the physical PCIe communication line 130, from the perspective of both the primary network interface 115 and the host computing system 105. Stated another way, from the perspective of the host computing system 105, the network security FPGA 150 appears to merely be the primary network interface 115, and from the perspective of the primary network interface 115, the network security FPGA 150 appears to be the host computing system 105 (or another component within the system 100, 200).

Also similarly, the memory 140 (and any memory 190) are also shielded by the network security FPGA 150, as they have no link into the system 100, 200 except through the network security FPGA 150. Accordingly, the memories 140 and 190 also remain as trusted components within the system 100, 200, 400, 500.

As a result, any malware entering the system 100, 200, 400, 500 also cannot detect the network security FPGA 150, such as by probing, and lacking any physical address within the system 100, 200, 400, 500, any malware cannot communicate with the network security FPGA 150.

By the network security FPGA 150 being coupled in between the primary network interface 115 and I/O connector(s) 415 for external communication, or by being coupled between the primary network interface 115 and the host computing system 105, the network security FPGA 150 can have many different functions, all within the scope of the present disclosure. First, it can examine any and all data packets entering the system 100, 200, 400, 500 through the I/O connector(s) 415 or primary network interface 115, allowing it to intervene in the event of a malware data packet. For example, it can refrain from forwarding a data packet from the I/O connector(s) 415 or the primary network interface 115 into the system 100, 200, 400, 500, e.g., the network security FPGA 150 may discard the malware data packet. Any method of malware detection which is currently known or which becomes known may be utilized and is within the scope of the present disclosure, e.g., comparison of a hash result computed from a data packet with a list or database of results indicative of malware, for example and without limitation.

Secondly, this data examination is bi-directional, namely, the network security FPGA 150 may also examine any and all data packets from the host computing system 105 which could enter the larger network through the primary network interface 115, also allowing it to intervene in the event of a malware data packet which originates from the host computing system 105, e.g., in the event the host computing system 105 is infected with malware from another source, such as from a thumb drive or another drive which may be coupled to the host computing system 105 through a USB port, for example and without limitation.

The network security FPGA 150 may also be configured to monitor any malware entering the system 100, 200, 400, 500, such as to determine its origin, and to determine what operations the malware has been designed to perform. For example, the network security FPGA 150 may monitor the host memory 120 and discover how the malware might be behaving.

While the network security FPGA 150 cannot be seen within the system 100, 200, 400, 500, it nonetheless has access to the PCIe communication lines 130, and can read and write data from and to anywhere in the system 100, 200, 400, 500, without host CPU 110 involvement, including manipulating the host memory 120. For example, the network security FPGA 150 may examine (read from) the host memory 120, and in response to detection of malware, such as in the host operating system stored in memory 120, may halt the host CPU 110 and rewrite the host operating system, e.g., write over the infected host operating system (using a version of the host operating system stored in either of the trusted memories 140, 190), thereby eliminating the malware and restoring the host operating system to an uninfected state.

Another significant feature of the network security FPGA 150 interposed between the host computing system 105 and the primary network interface 115, particularly in the modular system illustrated in FIGS. 3A and 3B, 5 and 6, is that the network security FPGA 150 may also be configured to perform real-time, network rate encryption of outgoing data packets and decryption of incoming data packets.

As a consequence, this system 100, 200, 400, 500 configuration, using the circuit board modules 180, 185, 450, 450A, creates a multifunction, modular security system, for network security, secure communications, and protection against malware.

In various embodiments, as mentioned above, a secondary network interface 155 (and/or I/O capability within the network security FPGA 150, as illustrated in FIGS. 5 and 6) may be utilized for communication with a trusted or otherwise nonpublic network or system. For example, a system administrator may have need to access and update a configuration of the network security FPGA 150. As the network security FPGA 150 is not visible within the system 100, 200, 400, 500, provision for such direct access to the network security FPGA 150 may be highly desirable.

Figure 4:
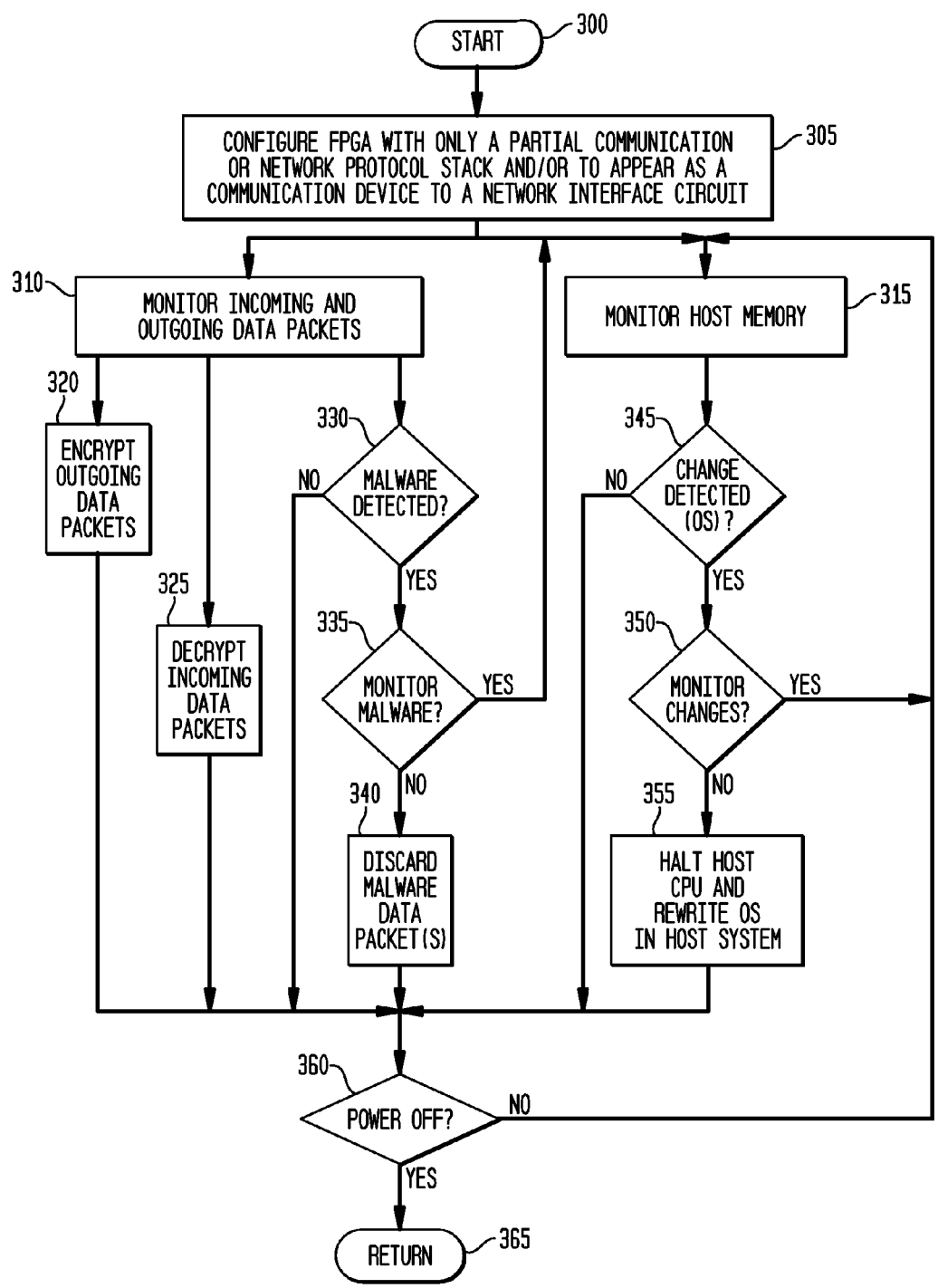
FIG. 4 is a flow diagram illustrating an exemplary or representative method embodiment.

FIG. 4 is a flow diagram illustrating an exemplary or representative method embodiment for system 100, 200, 400, 500 configuration and reconfiguration, and provides a useful summary. Beginning with start step 300 and one or more FPGA 150 configurations (as configuration bit images) having been stored in a trusted memory 140, the system 100, 200, 400, 500 powers on or otherwise starts up, and the FPGA 150 loads the base communication functionality, such as a PCIe configuration image (and possibly DMA functionality) from nonvolatile memory 140, for system 100, 200 (500) embodiments having a network security FPGA 150 as a PCIe endpoint device, or loads the configuration to appear as a communication device to a primary network interface 115 for system 400, 500 embodiments as discussed above, step 305. As part of step 305, for system 100, 200 (500) embodiments, the communication functionality specifically does not include an entire communication or network protocol stack, but is typically limited specifically to the physical layer and the data link layer, such as for PCIe communication functionality, or otherwise limited only to those protocol layers which do not result in the network security FPGA 150 being addressable or visible within the system 100, 200 (500).

The network security FPGA 150 may then commence operations and monitor incoming and outgoing data packets, step 310, may monitor host memory 120, step 315, may encrypt outgoing data packets, step 320, and may decrypt incoming data packets, step 325, and/or any selected one or more of these various functions. For example, in various exemplary embodiments, the network security FPGA 150 may be implemented for monitoring functions, without encryption/decryption, and vice-versa, for example and without limitation. In addition, steps 310, 315, 320 and/or 325 may be performed concurrently or sequentially, depending upon the selected embodiment.

When malware may be detected, step 330, a determination may be made as to whether the malware is merely to be monitored, step 335, and if not, the malware data packet is discarded, step 340. When the malware is to be monitored, the method proceeds to step 315 for monitoring of the host memory (and when the system is to remain on (step 360), the method returns to step steps 310-325 and continues to iterate). When no malware is detected in step 330, and when the system is to remain on (step 360), the method returns to step steps 310-325 and continues to iterate.

When the host memory is monitored, step 315, and a potentially unwanted change in the host memory is detected, step 345, such as a change in the host operating system, a determination may be made as to whether the change(s) is merely to be monitored, step 350. When the change to the host memory, such as the host operating system is to be monitored, the method returns to step 315 and continues to iterate. When the change to the host memory is not to be just monitored in step 350, the network security FPGA 150 halts the host CPU 110 and rewrites the host memory 120, typically rewriting the stored host operating system portion of the host memory 120, and when the system is to remain on (step 360), the method returns to steps 310-325 and continues to iterate. When the system 100, 200 is powered off, step 360, the method may end, return step 365.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

A CPU or "processor" 110 may be any type of processor, and may be embodied as one or more processors 110, configured, designed, programmed or otherwise adapted to perform the functionality discussed herein. As the term processor is used herein, a processor 110 may include use of a single integrated circuit ("IC"), or may include use of a plurality of integrated circuits or other components connected, arranged or grouped together, such as controllers, microprocessors, digital signal processors ("DSPs"), parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components, whether analog or digital. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SDRAM, SRAM, MRAM, ROM, FLASH, EPROM or $E^2$PROM. A processor (such as processor 110), with its associated memory, may be adapted or configured (via programming, FPGA interconnection, or hard-wiring) to perform the methodology of the invention, as discussed above. For example, the methodology may be programmed and stored, in a processor 110 with its associated memory (and/or memory 120) and other equivalent components, as a set of program instructions or other code (or equivalent configuration or other program) for subsequent execution when the processor is operative (i.e., powered on and functioning). Equivalently, when the processor 110 may implemented in whole or part as FPGAs, custom ICs and/or ASICs, the FPGAs, custom ICs or ASICs also may be designed, configured and/or hard-wired to implement the methodology of the invention. For example, the processor 110 may be implemented as an arrangement of analog and/or digital circuits, controllers, microprocessors, DSPs and/or ASICs, collectively referred to as a "controller", which are respectively hard-wired, programmed, designed, adapted or configured to implement the methodology of the invention, including possibly in conjunction with a memory 120.

The memory 120, 190, which may include a data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor 110), whether volatile or non-volatile, whether removable or non-removable, including without limitation RAM, FLASH, DRAM, SDRAM, SRAM, MRAM, FeRAM, ROM, EPROM or $E^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory 120 may be adapted to store various look up tables, parameters, coefficients, other information and data, programs or instructions (of the software of the present invention), and other types of tables such as database tables.

As indicated above, the processor 110 is hard-wired or programmed, using software and data structures of the invention, for example, to perform the methodology of the present invention. As a consequence, the system and method of the present invention may be embodied as software which provides such programming or other instructions, such as a set of instructions and/or metadata embodied within a non-transitory computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the processor 110, for example).

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory 120, 190, e.g., a floppy disk, a CDROM, a CD-RW, a DVD, a magnetic hard drive, an optical drive, or any other type of data storage apparatus or medium, as mentioned above.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. An apparatus coupleable to a host computing system, the apparatus comprising:
an input-output connector coupleable to a data network;
a network interface circuit coupleable to a first PCIe communication line for communication with the host computing system, the network interface further having at least one communication port;
a nonvolatile memory storing a configuration bit image; and
a field programmable gate array coupled to the input-output connector and to the nonvolatile memory, the field programmable gate array further coupled to the network interface circuit through the at least one communication port, the field programmable gate array configurable using the configuration bit image to appear solely as a communication device to the network interface circuit when coupled to the at least one communication port, and the field programmable gate array configurable to bidirectionally monitor all data packets transferred between the input-output connector and the network interface circuit and the host computing system.

2. The apparatus of claim 1, wherein the field programmable gate array is further configurable to detect a malware data packet.

3. The apparatus of claim 2, wherein the field programmable gate array is further configurable, in response to detection of a malware data packet from the host computing system, to halt the host computing system.

4. The apparatus of claim 2, wherein the field programmable gate array is further configurable, in response to detection of a malware data packet from the input-output connector or the data network, to discard the malware data packet or to monitor an operation implemented using the malware data packet.

5. The apparatus of claim 1, wherein the field programmable gate array is further configurable to monitor a host memory and, in response to an unauthorized modification, to halt a host processor and restore a host operating system.

6. The apparatus of claim 1, wherein the nonvolatile memory further stores an operating system image, and the field programmable gate array is further configurable to monitor the host operating system and, in response to an unauthorized modification, to restore the host operating system using the operating system image.

7. The apparatus of claim 1, further comprising:
a second memory coupled to the field programmable gate array, the second memory storing an operating system image;
wherein the field programmable gate array is further configurable to monitor the host operating system and, in response to an unauthorized modification, to restore the host operating system using the operating system image.

8. The apparatus of claim 1, wherein the field programmable gate array is further configurable to decrypt all data packets from the input-output connector and to encrypt all data packets from the network interface circuit and the host computing system.

9. The apparatus of claim 1, wherein the at least one communication port is a serial gigabit media independent interface port.

10. The apparatus of claim 1, further comprising:
a second PCIe communication line coupled to the field programmable gate array;
wherein the field programmable gate array is further configurable using the configuration bit image for only a partial implementation of a communication protocol.

11. The apparatus of claim 10, wherein the partial implementation of the communication protocol is a PCIe physical layer, or both the PCIe physical layer and a PCIe data link layer.

12. An apparatus coupleable to a host computing system, the apparatus comprising:
an input-output connector coupleable to a data network;
a network interface circuit coupleable to a first PCIe communication line for communication with the host computing system, the network interface further having at least one communication port;
a nonvolatile memory storing a configuration bit image; and
a field programmable gate array coupled to the input-output connector and to the nonvolatile memory, the field programmable gate array further coupled to the network interface circuit through the at least one communication port, the field programmable gate array further coupleable to a second PCIe communication line for communication with the host computing system, the field programmable gate array configurable using the configuration bit image to appear solely as a communication device to the network interface circuit when coupled to the at least one communication port, the field programmable gate array further configurable using the configuration bit image for only a partial implementation of a communication protocol, and the field programmable gate array configurable to bidirectionally monitor all data packets transferred between the input-output connector and the network interface circuit and the host computing system.

13. The apparatus of claim 12, wherein the partial implementation of the communication protocol is a PCIe physical layer, or both the PCIe physical layer and a PCIe data link layer.

14. The apparatus of claim 12, wherein the field programmable gate array is further configurable to detect a malware data packet, and in response to detection of a malware data packet to perform at least one action selected from the group consisting of: halt the host computing system; discard the malware data packet; monitor an operation implemented using the malware data packet; halt a host processor; restore a host operating system; and combinations thereof.

15. The apparatus of claim 12, wherein the field programmable gate array is further configurable to decrypt all data packets from the input-output connector and to encrypt all data packets from the network interface circuit and the host computing system.

16. The apparatus of claim 12, wherein the at least one communication port is a serial gigabit media independent interface port.

17. A network interface circuit board coupleable to a host computing system, the network interface circuit board comprising:
an input-output connector coupleable to a data network;
at least one first PCIe communication line;
at least one PCIe connector to couple the at least one first PCIe communication line to the host computing system;
a network interface circuit coupleable to the first PCIe communication line for communication with the host computing system, the network interface further having at least one communication port;
a nonvolatile memory storing a configuration bit image; and
a field programmable gate array coupled to the input-output connector and to the nonvolatile memory, the field programmable gate array further coupled to the network interface circuit through the at least one communication port, the field programmable gate array configurable using the configuration bit image to appear solely as a communication device to the network interface circuit when coupled to the at least one communication port, the field programmable gate array configurable to bidirectionally monitor all data packets transferred between the input-output connector and the network interface circuit and the host computing system.

18. The network interface circuit board of claim 17, wherein the at least one communication port is a serial gigabit media independent interface port.

19. The network interface circuit board of claim 17, further comprising:
a second PCIe communication line coupled to the field programmable gate array;
wherein the field programmable gate array is further configurable using the configuration bit image for only a partial implementation of a communication protocol.

20. The network interface circuit board of claim 19, wherein the partial implementation of the communication protocol is a PCIe physical layer, or both the PCIe physical layer and a PCIe data link layer.

21. A method of providing network security in a system having a field programmable gate array ("FPGA") coupled between a network and a network interface circuit coupleable to a host computing system, the method comprising:
configuring the field programmable gate array to appear as a communication device to the network interface circuit;
configuring the field programmable gate array with a device name and a link speed to appear as the communication device to a serial gigabit media independent interface port of the network interface circuit; and
using the field programmable gate array, bidirectionally monitoring all data packets transferred between the network interface circuit and the host computing system.

22. The method of claim 21, further comprising:
using the field programmable gate array, detecting a malware data packet, and in response to a detection of a malware data packet, performing at least one action selected from the group consisting of: halting the host computing system; discarding the malware data packet; monitoring an operation implemented using the malware data packet; halting a host processor; restoring a host operating system; and combinations thereof.

23. The method of claim 21, further comprising:
configuring the field programmable gate array for only a partial implementation of a communication protocol.

24. The method of claim 23, wherein the partial implementation of the communication protocol is a PCIe physical layer, or both the PCIe physical layer and a PCIe data link layer.

* * * * *